(12) United States Patent  (10) Patent No.: US 9,409,208 B2
Convery et al.  (45) Date of Patent: Aug. 9, 2016

(54) SCREEN ASSEMBLY

(71) Applicant: CDE Global Limited, Cookstown, County Tyrone (GB)

(72) Inventors: Anthony Convery, Moneymore (GB); Glenn Sloan, Castlerock (GB)

(73) Assignee: CDE Global Limited, Cookstown (GB)

( * ) Notice: Subject to any disclaimer, the term of this patent is extended or adjusted under 35 U.S.C. 154(b) by 0 days.

(21) Appl. No.: 14/629,800

(22) Filed: Feb. 24, 2015

(65) Prior Publication Data

US 2015/0239013 A1  Aug. 27, 2015

(30) Foreign Application Priority Data

Feb. 25, 2014  (GB) .................................. 1403245.2
Mar. 13, 2014  (GB) .................................. 1404507.4

(51) Int. Cl.
*B07B 1/28* (2006.01)
*B07B 1/46* (2006.01)
*B01D 33/03* (2006.01)

(52) U.S. Cl.
CPC .......... *B07B 1/4609* (2013.01); *B01D 33/0346* (2013.01); *B07B 1/28* (2013.01); *B07B 1/286* (2013.01); *B07B 1/4645* (2013.01)

(58) Field of Classification Search
CPC .......... B07B 1/28; B07B 1/284; B07B 1/286; B07B 1/46; B07B 1/4609
USPC ......................................... 209/269, 309, 325
See application file for complete search history.

(56) References Cited

U.S. PATENT DOCUMENTS

| 2,973,865 | A | * | 3/1961 | Cibula | ...................... B07B 1/28 209/315 |
| 3,970,549 | A | * | 7/1976 | Ennis | ...................... B01D 35/20 209/341 |
| 4,100,248 | A | * | 7/1978 | Adams | ................. B01D 29/012 162/903 |

(Continued)

FOREIGN PATENT DOCUMENTS

| CN | 201441973 | 4/2010 |
| CN | 202098880 | 1/2012 |

(Continued)

OTHER PUBLICATIONS

United Kingdom Search Report Under Section 17, corresponding to United Kingdom Application No. GB1403245.2, dated Aug. 25, 2014.

(Continued)

*Primary Examiner* — Terrell Matthews
(74) *Attorney, Agent, or Firm* — Gardner, Linn, Burkhart & Flory, LLP

(57) ABSTRACT

A screen assembly for grading and dewatering sand includes a frame upon which is mounted a deck having a plurality of apertures therein. The frame is mounted on a base and includes a vibration generating device for imparting vibration to the deck. The deck has a first portion inclined downwardly from a first end to second end for grading sand thereon, and a second portion for dewatering sand thereon. The first deck portion is inclined downwardly at a first angle, and the second portion is arranged substantially horizontally or inclined upwardly at a second angle. Sand may be delivered onto the deck at or adjacent the first end of the first portion, so that undersized particles of sand passing through the apertures in the first portion of the deck as oversized particles pass onto the second portion of the deck, whereby the oversized particles are dewatered.

20 Claims, 3 Drawing Sheets

(56) References Cited

U.S. PATENT DOCUMENTS

| | | | | |
|---|---|---|---|---|
| 4,519,902 A | * | 5/1985 | Kinder | B01D 35/20 209/234 |
| 6,889,846 B2 | * | 5/2005 | Olsen | B07B 1/46 209/309 |
| 2003/0173257 A1 | | 9/2003 | Olsen et al. | |
| 2005/0035033 A1 | | 2/2005 | Adams et al. | |
| 2015/0239013 A1 | * | 8/2015 | Convery | B07B 1/286 209/269 |

FOREIGN PATENT DOCUMENTS

| | | | | |
|---|---|---|---|---|
| CN | 203389407 | | 1/2014 | |
| GB | 1196303 | | 6/1970 | |
| GB | 1441313 | | 6/1976 | |
| GB | 1441313 A | * | 6/1976 | B01D 35/28 |
| GB | 1447714 A | * | 8/1976 | B01D 35/20 |

OTHER PUBLICATIONS

European Search Report corresponding to European Application No. 15156120.6, dated Jul. 2, 2015.

* cited by examiner

SCREEN ASSEMBLY

FIELD OF THE INVENTION

This invention relates to a screen assembly, and in particular to a screen assembly for both grading and dewatering sand in a single stage.

BACKGROUND OF THE INVENTION

Vibrating screens are commonly used to separate excess water from particulate materials, for example in sand quarrying to remove excess water from sand following grading and/or washing processes, and are used to sort, grade or classify particulate material, such as sand.

A typical vibrating screen comprises a frame, defined by a pair of substantially parallel side walls interconnected by transversely extending bridging members, upon which is mounted a substantially horizontal polyurethane deck having small openings or slots for water and/undersize particles to pass through.

The frame is mounted on a base via resilient linkages, such as springs, and the frame, and thus the deck, is typically vibrated by means of a pair of counter rotating rotors defining eccentric masses, driven by one or more drive motors, to impart circular or reciprocating vibratory motion to the deck.

Dewatering screens are used to separate excess water from particulate materials and are used in sand quarrying to remove excess water from sand following grading and/or washing processes.

A typical dewatering screen comprises a frame upon which is mounted a substantially horizontal polyurethane deck having small openings (approximately 0.25 mm diameter) for water to pass through. The deck is vibrated at high frequency to shake out excess water through the openings and to convey the material across the deck to one end of the screen whereby the dry material is discharged over the top of a weir onto a conveyor or into a collection hopper.

Screens are also used to grade particulate material, in particular sand, by particle size. In a grading screen the deck is arranged at a predetermined slope and material to be graded is delivered onto an upper end of the deck, typically entrained in a flow of water. The deck is vibrated at high frequency to convey the material over the deck and to cause undersize material (and water) to pass through the openings, oversize material being discharged from a lower end of the deck onto a conveyor or into a collection bay or hopper for subsequent dewatering. It is known to provide grading screens wherein the angle of declination of the screen deck varies along its length in order to control the speed of movement of material over the screen deck, for example to slow the material to allow it to be graded more effectively adjacent a lower end of the deck (such as that shown in CN201441973). Such screens are typically referred to as "banana screens" due to their arcuate profile.

However, no prior art screens have been provided that can be effectively grade and also dewater a particulate material on a single deck.

SUMMARY OF THE INVENTION

According to the present invention there is provided a screen assembly for grading and dewatering sand comprising a frame upon which is mounted a deck having a plurality of apertures therein, the frame being mounted on a base and being provided with a vibration generating device for imparting vibration to the deck, wherein the deck includes a first portion inclined downwardly from a first end to second end for grading sand thereon and a second portion for dewatering sand thereon, wherein the first portion of the deck is inclined downwardly at a first angle to the horizontal with respect to the normal direction of travel of material on the deck and the second portion being arranged substantially horizontally or inclined upwardly at a second angle to the horizontal with respect to the normal direction of travel of material on the deck wherein, in use, sand may be delivered onto the deck at or adjacent the first end of the first portion, undersized particles of sand passing through the apertures in the first portion of the deck as oversized particles are conveyed over the first portion of the deck under the action gravity before passing onto the second portion of the deck, whereby the oversized particles are dewatered.

Preferably the second angle is less than 5°. Preferably the first angle is greater than 5°. In one embodiment the first angle may be approximately 25°.

Preferably the apertures in the first portion of the deck are larger than the apertures in the second portion of the deck. Alternatively the apertures in the first portion may be substantially the same size as the apertures in the second portion. The apertures in the first portion may be between 0.2 mm and 0.9 mm and the apertures in the second portion may be between 0.2 mm and 2 mm, more preferably between 0.3 mm and 1 mm.

A raised weir may be provided at or adjacent a discharge end of the second portion of the deck for retaining sand on the second portion of the deck during dewatering.

The frame may comprise a pair of substantially parallel side walls between which the deck is mounted. The side walls may be interconnected by a plurality of bridge members extending therebetween. The vibration generating device may comprise one or more eccentrically rotating shafts, preferably being housed within an elongate tubular housing extending between the side walls of the frame. The elongate housing may define a structural component of the frame. Preferably the elongate tubular housing is located above the deck.

Each side wall may be formed from a plurality of parallel plates comprising an outer plate, and inner plate and at least one intermediate plate, the intermediate plate having cut-outs formed therein to define a plurality of elongate reinforcing ribs. Said plurality of parallel plates forming each side wall of the frame are preferably clamped together via a plurality of mechanical fasteners.

The deck may be formed from one or more polyurethane sheets.

Preferably the frame is supported on the base via resilient mountings permitting movement of the frame with respect to the base.

The length of the first portion of the deck may be greater than the length of the second portion of the deck.

These and other objects, advantages and features of the invention will become apparent upon review of the following specification in conjunction with the drawings.

BRIEF DESCRIPTION OF THE DRAWINGS

An embodiment of the present invention will now be described, by way of example only, with reference to the accompanying drawings, in which.

DESCRIPTION OF THE PREFERRED EMBODIMENTS

Figure 1:
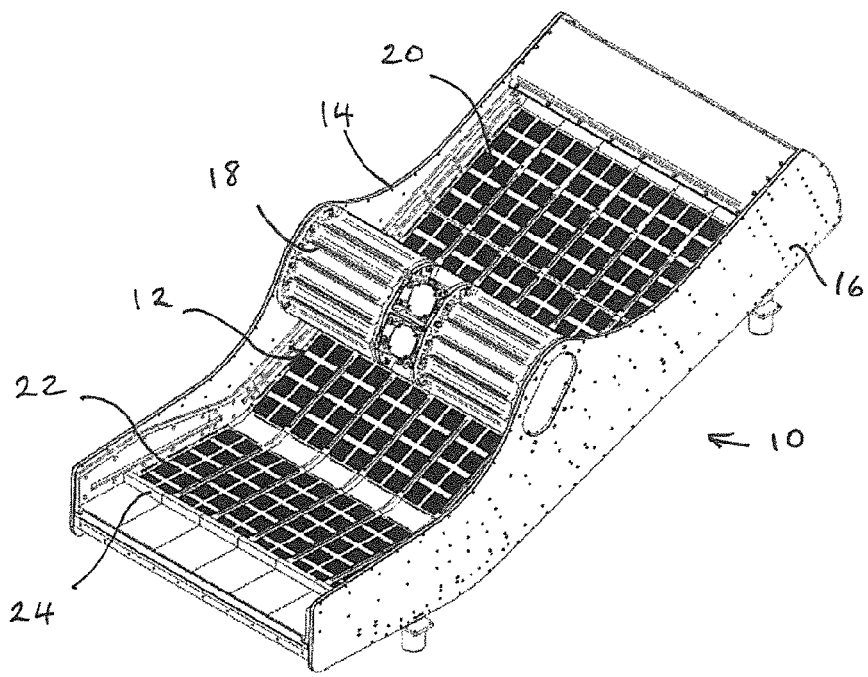
FIG. 1 is a perspective view of a combined grading and dewatering screen assembly in accordance with an embodiment of the present invention.
Figure 2:
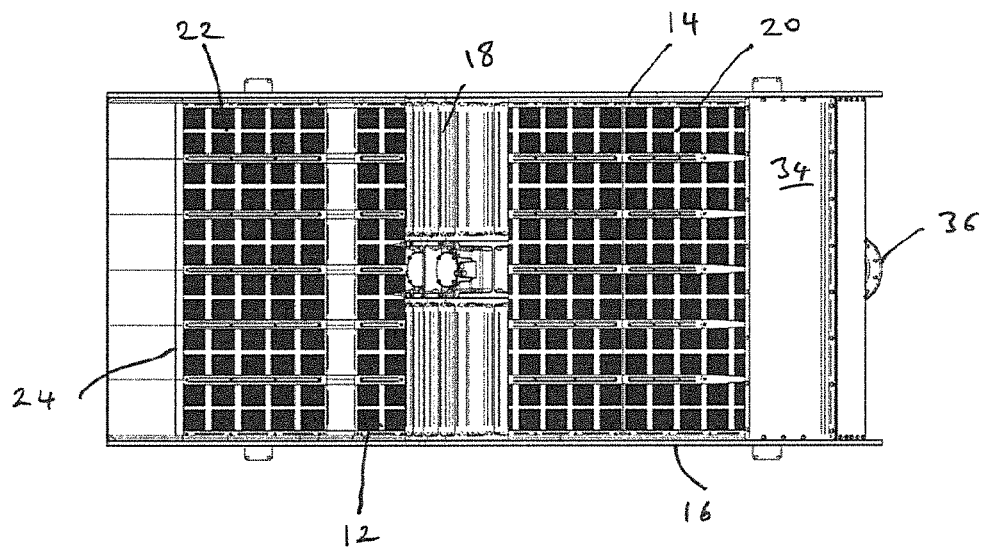
FIG. 2 is a plan view of the screen assembly of FIG. 1.
Figure 3:
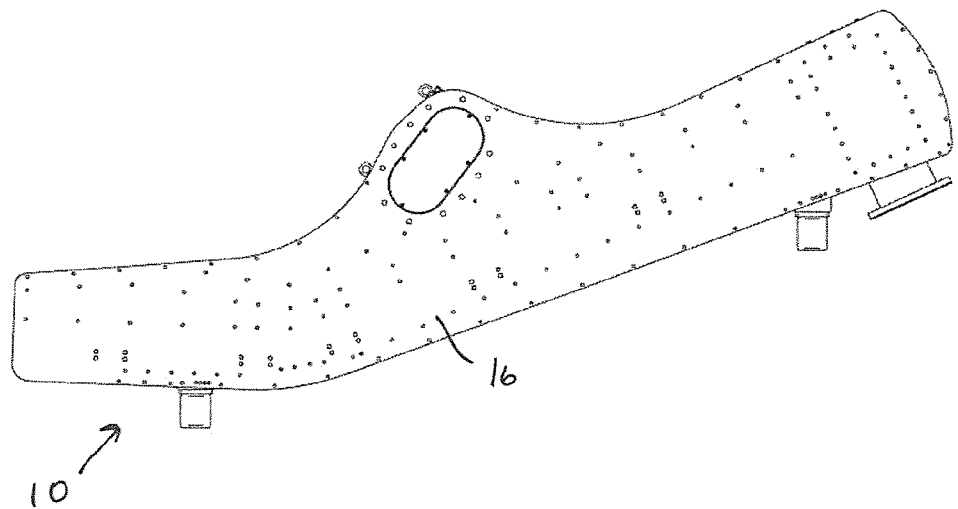
FIG. 3 is a side view of the screen assembly of FIG. 1.
Figure 4:
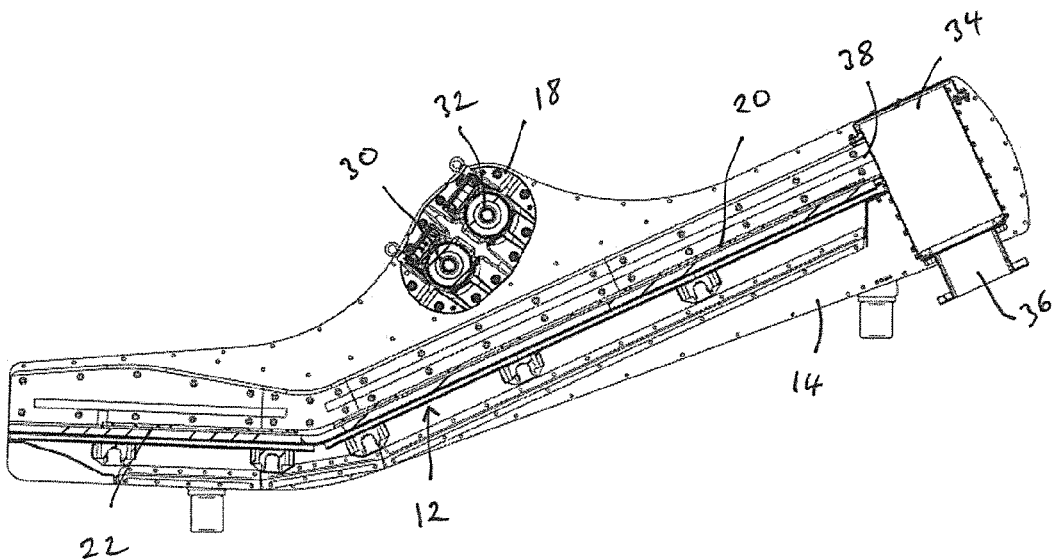
FIG. 4 is a longitudinal sectional view of the screen assembly of FIG. 1.
Figure 5:
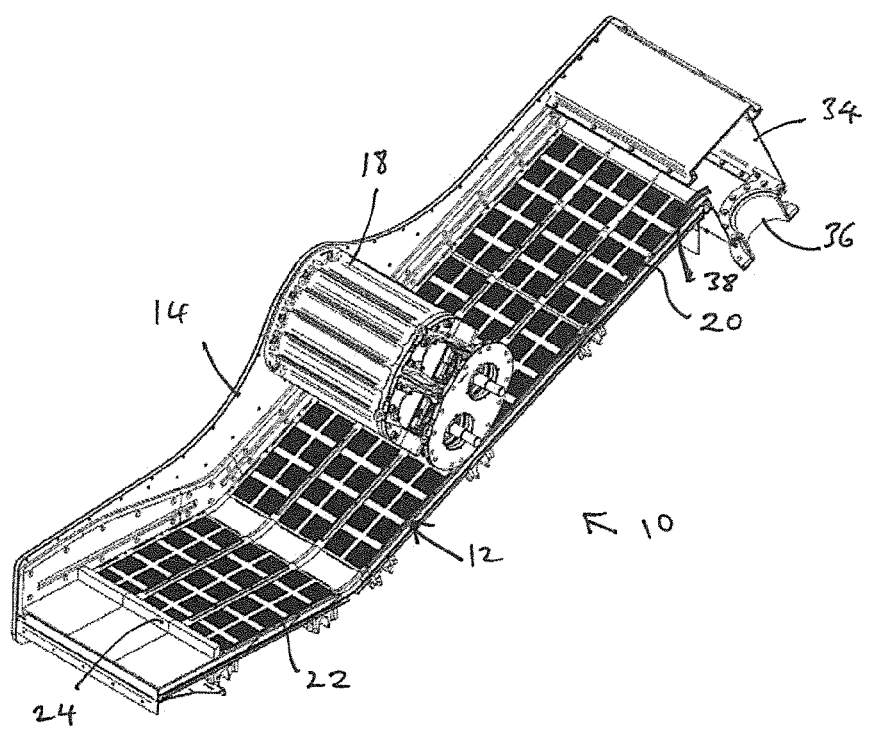
FIG. 5 is a perspective sectional view of the screen assembly of FIG. 1.

A combined grading and dewatering screen assembly in accordance with an embodiment of the present invention is illustrated in the FIGS. 1 to 4. The screen assembly 10 comprises a polyurethane deck 12 having a plurality of small slots formed therein. The deck 12 is mounted on a support frame comprises spaced apart side walls 14,16 joined by transversely extending bridging members extending beneath the deck (not shown).

The support frame may be mounted on a base frame (not shown) via resilient mountings to allow the support frame to move with respect to the base frame. The support frame may be suspended from the base frame via suitable resilient mounts, such as springs.

A vibration generating device is mounted between the side plates 14,16 of the support frame, extending transverse to the deck 12 of the screen assembly 10. The vibration generating device may comprise a pair of motor driven eccentrically loaded rotors 30, 32 (FIG. 4) mounted within a support pipe 18 mounted between the side plates 14,16 for rotation about substantially parallel rotational axes extending transverse to the deck 12 or a single eccentrically driven rotor. The rotor or rotors may be adapted to generate a reciprocal or rotary motion to the deck 12. While the support pipe 18 housing the rotors is shown in drawings as being mounted above the deck 12, it is envisaged, that the or each rotor may be mounted beneath the deck 12, preferably within a tube mounted between the side plates.

Rotation of the rotor or rotors causes a rotating out of balance force to be applied to the support frame, imparting a vibratory motion to the deck 12 and to the material carried thereon. Such vibratory motion causes the material placed on the deck 12 to be agitated, preventing blocking of the openings in the deck and causing material on the deck 12 to be conveyed towards one end of the screen assembly 10.

The deck 12 is divided into a first or upstream portion comprising a grading section 20, upon which sand can be graded, undersize particles passing through the slots while oversized particles are retained on the deck, and a second or downstream portion comprising a dewatering section 22, upon which the sand, comprising the oversized particles, is dewatered.

A feed box 34 is provided at an upper end of the deck 12 to feed water having sand entrained thereon onto the deck 12. The sand/water mix is passed into the feed box 34 via an inlet port 26 provided on a lower side of the feed box 34. The mixture passes out of the feed box 34 onto the deck via an elongate slot 38 provided in a side of the feed box 34.

The grading section 20 of the deck is arranged to slope downwardly towards the dewatering section 22 at an angle to the horizontal suited to the grading operation, while the dewatering section 22 of the deck is arranged substantially horizontally or at a shallow upward angle sloping upwardly towards a discharge end of the dewatering section 22 to suite the dewatering operation.

The grading section 20 of the deck may be arranged at an angle of about 25° to the horizontal.

Preferably the dewatering section 22 of the deck slopes upwardly towards a discharge end thereof at an angle of between 0.5° and 5°. Alternatively the dewatering section may be arranged substantially horizontally.

An upstanding weir 24 may be provided at or adjacent a discharge end of the dewatering section 22 of the deck 12 to retain sand upon the deck 12 during dewatering. It will be appreciated that the weir may be omitted where the upward slope of the dewatering section 22 is sufficient to retain sand upon the deck.

The apertures or slots formed within the grading section 20 of the deck 22 may be between 0.2 mm and 2 mm wide while the apertures or slots in the dewatering section 22 of the deck 12 may be between 0.2 mm to 0.9 mm wide. The apertures in both the grading section 20 and the dewatering section 22 may be the same size.

The length of the grading section 20 may be greater than the length of the dewatering section 22. Preferably the length of the grading section 20 is more than twice the length of the dewatering section 22.

Preferably the side walls 14,16 of the frame are made up of a laminated assembly of approximately 4 mm thick outer steel plates defining outer skins of the respective side wall and an approximately 20 mm thick intermediate steel plate mounted therebetween. The outer skins and intermediate plate are clamped and connected together by nuts and bolts passing through the assembled plates. The intermediate plate may have a plurality of cut-outs formed therein defining hollow regions surrounded by elongate reinforcing webs and members. The shape and positions of the cut-outs can be selected to provide particular structural properties, such that the stiffness and strength of the side walls can be optimised while minimising the weight of the side walls 14,16 of the frame.

The invention is not limited to the embodiment(s) described herein but can be amended or modified without departing from the scope of the present invention. Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A screen assembly for grading and dewatering sand comprising a frame upon which is mounted a deck having a plurality of apertures therein, the frame being mounted on a base and being provided with a vibration generating device for imparting vibration to the deck, wherein the deck comprises a first portion inclined downwardly from a first end to a second end for grading sand thereon, and a second portion for dewatering sand thereon, wherein the first portion of the deck is inclined downwardly at a first angle to the horizontal with respect to the normal direction of travel of material on the deck and the second portion being inclined upwardly at a second angle to the horizontal with respect to the normal direction of travel of material on the deck wherein, in use, sand may be delivered onto the deck at or adjacent the first end of the first portion, undersized particles of sand passing through the apertures in the first portion of the deck as oversized particles are conveyed over the first portion of the deck under the action of gravity before passing onto the second portion of the deck, whereby the oversized particles are dewatered.

2. A screen assembly as claimed in claim 1, wherein the second angle is less than 5°.

3. A screen assembly as claimed in claim 1, wherein the first angle is greater than 5°.

4. A screen assembly as claimed in claim 3, wherein the first angle is approximately 25°.

5. A screen assembly as claimed in claim 1, wherein the apertures in the first portion of the deck are larger than the apertures in the second portion of the deck.

6. A screen assembly as claimed in claim 1, wherein the apertures in the first portion of the deck are substantially the same size as the apertures in the second portion of the deck.

7. A screen assembly as claimed in claim 1, wherein a raised weir is provided at or adjacent a discharge end of the second portion of the deck for retaining sand on the second portion of the deck during dewatering.

8. A screen assembly as claimed in claim 1, wherein the frame comprises a pair of substantially parallel side walls between which the deck is mounted.

9. A screen assembly as claimed in claim 8, wherein the side walls are interconnected by a plurality of bridge members extending therebetween.

10. A screen assembly as claimed in claim 8, wherein the vibration generating device comprise one or more eccentrically rotating shafts, the one or more eccentrically rotating shafts being housed within an elongate tubular housing extending between the side walls of the frame, the elongate housing defining a structural component of the frame.

11. A screen assembly as claimed in claim 10, wherein the elongate tubular housing is located above the deck.

12. A screen assembly as claimed in claim 8, wherein each side wall is formed from a plurality of parallel plates comprising an outer plate, and inner plate and at least one intermediate plate, the intermediate plate having cut-outs formed therein to define a plurality of elongate reinforcing ribs.

13. A screen assembly as claimed in claim 12, wherein the plurality of parallel plates forming each side wall of the frame are clamped together via a plurality of mechanical fasteners.

14. A screen assembly as claimed in claim 1, wherein the length of the first portion of the deck is greater than the length of the second portion of the deck.

15. A screen assembly as claimed in claim 14, wherein the length of the first portion of the deck is more than twice the length of the second portion of the deck.

16. A screen assembly for grading and dewatering sand comprising a frame upon which is mounted a deck having a plurality of apertures therein, the frame being mounted on a base and being provided with a vibration generating device for imparting vibration to the deck, wherein the deck comprises a first portion inclined downwardly from a first end to a second end for grading sand thereon, and a second portion for dewatering sand thereon, wherein the frame comprises a pair of substantially parallel side walls between which the deck is mounted, and wherein each side wall is formed from a plurality of parallel plates comprising an outer plate, and inner plate and at least one intermediate plate, the intermediate plate having cut-outs formed therein to define a plurality of elongate reinforcing ribs, wherein the first portion of the deck is inclined downwardly at a first angle to the horizontal with respect to the normal direction of travel of material on the deck and the second portion being arranged substantially horizontally or inclined upwardly at a second angle to the horizontal with respect to the normal direction of travel of material on the deck wherein, in use, sand may be delivered onto the deck at or adjacent the first end of the first portion, undersized particles of sand passing through the apertures in the first portion of the deck as oversized particles are conveyed over the first portion of the deck under the action of gravity before passing onto the second portion of the deck, whereby the oversized particles are dewatered.

17. A screen assembly as claimed in claim 16, wherein the plurality of parallel plates forming each side wall of the frame are clamped together via a plurality of mechanical fasteners.

18. A screen assembly for grading and dewatering sand, the screen assembly comprising:
   a frame;
   a deck mounted on the frame, the deck having a plurality of apertures therein, wherein the deck comprises a first portion for grading the sand and a second portion for dewatering the sand;
   a vibration generating device operable to impart vibration to the deck;
   the first portion of the deck being inclined downwardly from a first end to a second end, wherein the first portion of the deck is inclined downwardly at a first angle to the horizontal with respect to the normal direction of travel of material on the deck;
   the second portion of the deck being inclined upwardly at a second angle to the horizontal with respect to the normal direction of travel of material on the deck;
   wherein the length of the first portion of the deck is greater than the length of the second portion of the deck; and
   wherein the deck is configured so that when sand is delivered onto the deck at or adjacent the first end of the first portion, undersized particles of sand passing through the apertures in the first portion of the deck as oversized particles are conveyed over the first portion of the deck under the action of gravity before passing onto the second portion of the deck, whereby the oversized particles are dewatered.

19. A screen assembly as claimed in claim 18, wherein the length of the first portion of the deck is more than twice the length of the second portion of the deck.

20. A screen assembly as claimed in claim 2, wherein the first angle is greater than 5°.

* * * * *